2,920,051
WHETLERITE PRODUCT AND PROCESS

Edwin O. Wiig, Rochester, N.Y., and Norman L. Morse, San Francisco, Calif., assignors to the United States of America as represented by the Secretary of War No Drawing. Application January 22, 1944
Serial No. 519,384

10 Claims. (Cl. 252—447)

The invention described herein may be manufactured and used by or for the Government for governmental purposes without the payment to us of any royalty thereon.

This invention relates to absorbents and a process of producing the same. More particularly, this invention relates to charcoal absorbents that are suitable for removing poisonous contaminants, including cyanogen chloride, from a gas containing the same.

In the construction of gas masks, collective protectors and the like, a large variety of absorbents have been suggested and used for removing the various types of persistent and non-persistent gases which may be encountered in chemical warfare. An absorbent which has been used in the canisters of gas masks for the removal of certain poisonous contaminants from the air has been activated charcoal. In order to increase the activity of the activated charcoal for the removal of certain of the non-persistent gases, it has been proposed to pretreat the activated charcoal with ammoniacal solutions of copper carbonate. An activated charcoal impregnated in this manner by a standard procedure and thereafter heated to elevated temperatures is know as whetlerita, a term derived from the name of Joshua C. Whetzel, one of the inventors of an early form of copper-treated charcoal disclosed in the Robert E. Wilson et al. U.S. Letters Patent No. 1,519,470, issued December 16, 1924, for an improvement in "Impregnated Carbon and Process of Making Same." This whetlerite, when used in a gas mask canister, has been found to give satisfactory protection against such non-persistent gases as phosgene and hydrogen cyanide. In the copending patent application of Latimer et al., Serial No. 519,383, filed January 22, 1944, now abandoned, there is disclosed an improved type whetlerite containing copper and vanadium, chromium, or molybdenum with or without silver. This type of whetlerite, according to these investigators, has provided cyanogen chloride protection at 50% humidity for between 30 and 40 minutes, and at 80% relative humidity for 18 to 20 minutes.

It has been found that a satisfactory whetlerite which offers good protection against cyanogen chloride at high humidities may be prepared by impregnating an activated charcoal with a solution containing the compounds of copper, silver and chromium. According to the process disclosed in the copending application of Blacet et al., Serial N. 516,314, filed December 30, 1943, a whetlerite of this character may have an initial cyanogen chloride life of over 100 minutes, even when tested under conditions of high relative humidities. However, it has been observed that these whetlerites containing copper, silver and chromium have a tendency to lose their activity against cyanogen chloride during aging. It is an object of this invention to provide a whetlerite which has improved stability in respect to its activity, particularly as a protective agent against cyanogen chloride.

A further object of this invention is to provide an improved form of whetlerite which gives satisfactory protection against phosgene, hydrogen cyanide, cyanogen, arsine and cyanogen chloride under conditions of temperature and humidity that may be encountered in the field.

A further object of this invention is the provision of a process whereby a product having the above indicated characteristics may readily be produced.

Further and additional objects will appear from the following description and the appended claims.

When the term "absorbent" is used herein, it is intended to refer broadly to a material exhibiting either or both phenomena known as "absorption" and "adsorption."

A stabilized absorbent for removing poisonous contaminants, including cyanogen chloride, from a gas containing the same prepared in accordance with this invention, comprises a base charcoal having associated therewith copper or a compound thereof and at least one metal or a compound thereof selected from the group consisting of molybdenum, vanadium, chromium and tungsten which have been activated by heating a charcoal previously impregnated with a solution containing compounds of said metals and one or more organic substances. In accordance with one embodiment of this invention, this product may be prepared by impregnating an activated charcoal with a solution having dissolved therein a compound of copper, an organic substance, and a compound of a metal selected from the group consisting of molybdenum, vanadium, chromium and tungsten. The impregnated charcoal is then drained, dried, and heated to an elevated temperature which is sufficient, at least partially to decompose the organic substance in the charcoal. By this treatment, an impregnated activated charcoal is produced which is suitable for use in gas mask canisters and which offers substantial protection for the wearer against most chemical warfare agents, including cyanogen chloride, even under conditions of high relativity humidity.

If desired, a soluble compound of silver may be added to the impregnating solution to increase the activity of the resulting product against arsine at high relative humidities.

It is, in general, preferred that the above indicated impregnation be effected in a single step. However, it will be recognized that under certain conditions the impregnation may be carried out by using a number of separate solutions in a plurality of steps, if desired.

In order to demonstrate the product and process of this invention, there are here presented several specific examples of how the product may be produced. It will be recognized, of course, that this invention is not to be limited thereto; and it is intended that the invention is to be restricted only by the scope of the appended claims.

Example 1

An activated base charcoal (12–16 mesh) was selected and 100 cc. of it was impregnated with 100 cc. of an aqueous solution having dissolved therein:

| | Grams |
|---|---|
| Mo (as ammonium molybdate) | 2 |
| Cu (as basic carbonate) | 10 |
| $CO_2$ (as $(NH_4)_2CO_3 \cdot H_2O$) | 10 |
| $NH_3$ (as $NH_4OH$) | 10 |
| Tartaric acid | 5 |

The solution was prepared by dissolving one half of the molybdate in water and the other half in the $NH_4OH$. The $(NH_4)_2CO_3 \cdot H_2O$ (powdered) was added to the aqueous molybdate solution and mixed until almost dissolved. The ammoniacal molybdate solution was then added with stirring until everything was in complete solution. The copper carbonate was then added to the resulting solution followed by the tartaric acid. This solution was then diluted to the above indicated 100 cc. volume with water.

The charcoal was impregnated with the solution for a period of ½ hour and thereafter centrifuged, dried in a basket for about ¾ hour at 130° C. and finally dried in a flask at 315° C. for 3½ hours.

This sample, when tested under standard conditions against cyanogen chloride at 80% relative humidity (80–80), showed a life of 81 minutes when freshly prepared, of 70 minutes after standing for one day at 85° C., and of 72 minutes after standing at 60° C. for 11 days. The hydrogen cyanide life at 50% relative humidity (0–50) was 37 minutes. The cyanogen chloride life of a similar sample at 80–80 prepared without tartaric acid was only 44 minutes.

Samples prepared as above using maleic, citric, glycolic, fumaric, succinic, adipic, 1-maleic and salicylic acids in place of the tartaric acid exhibited 80–80 cyanogen chloride lives of between 50 and 70 minutes.

*Example 2*

An impregnating solution was prepared as indicated in the previous example except that silver nitrate was added in the form of a 10% aqueous solution in the final step of preparing the solution. The final solution consisted of water having dissolved therein the following substances in the indicated amounts based on 100 cc. of solution:

| | Gms. |
|---|---|
| Mo (as ammonium molybdate) | 5.0 |
| Cu (as basic carbonate) | 12.5 |
| Tartaric acid | 8.0 |
| $AgNO_3$ | 0.35 |
| $CO_2$ (total) | 11.0 |
| $CO_2$ (as $(NH_4)_2CO_3 \cdot H_2O$) | 5.3 |
| $CO_2$ (as basic $CuCO_3$) | 5.7 |
| $NH_3$ (total) | 12.6 |
| $NH_3$ (as $NH_4OH$) | 8.0 |
| $NH_3$ (as $(NH_4)_2CO_3 \cdot H_2O$) | 4.1 |
| $NH_3$ (as ammonium molybdate) | 0.5 |

An activated charcoal was soaked for ½ hour with an equal volume of a solution having the composition indicated above. The impregnated charcoal was then drained for 15 minutes and dried in a rotary drier. The sample was rapidly heated to about 300° C. and then allowed to cool to 100° C. before removal from the drying oven.

This sample, when tested under standard conditions against cyanogen chloride at 80–80 showed a life of 99 minutes when freshly prepared, of 93 minutes after standing for two days at 85° C., of 95 minutes after standing for 7 days at 85° C., and of 78 minutes after standing for 10 days at 60° C. The hydrogen cyanide life at 0–50 was 57 minutes. The cyanogen chloride life at 80–80 of a similar sample containing no tartaric acid or other organic substance was only 70 minutes.

Good absorbents were also prepared by substituting sucrose, glycerine, ethylene glycol, pyruvic acid, glycine, isopropyl alcohol and other organic compounds for the tartaric acid suggested in this example.

*Example 3*

An impregnating solution containing water as the solvent was prepared having the following ingredients based on 100 cc. of solution:

| | Gms. |
|---|---|
| V (as ammonium vanadate) | 3.5 |
| Cu (as basic carbonate) | 12.5 |
| $AgNO_3$ | 0.35 |
| Tartaric acid | 8.0 |
| $CO_2$ (total) | 11.0 |
| $CO_2$ (as $(NH_4)_2CO_3 \cdot H_2O$) | 5.3 |
| $CO_2$ (as basic $CuCO_3$) | 5.7 |
| $NH_3$ (total) | 13.3 |
| $NH_3$ (as $NH_4OH$) | 8.0 |
| $NH_3$ (as $(NH_4)_2CO_3$) | 4.1 |
| $NH_3$ (as ammonium vanadate) | 1.2 |

The solution was prepared by mixing the ammonium vanadate, copper carbonate, and ammonium carbonate with a small quantity of water to form a thin paste. The ammonium hydroxide was then added and the mixture stirred thoroughly. Thereafter the silver nitrate (as a 10% aqueous solution) and the tartaric acid were added successively. The resulting mixture was then stirred with the addition of a small amount of water until everything was dissolved, and thereafter diluted to volume.

This solution was used to impregnate an activated charcoal (12–30 mesh) in the manner substantially as specified in Example 2. This sample had a hydrogen cyanide life of 52 minutes and a cyanogen chloride life at 80–80 of 196 minutes when freshly prepared and of 154 minutes after standing for 2 days at 85° C.

A sample prepared without tartaric acid as indicated in the example had a cyanogen chloride life at 80–80 of only 12 minutes.

It will, of course, be recognized that the various ingredients of the absorbent composition of this invention may be incorporated with the charcoal by methods other than those which have been specified in the foregoing examples. For example, any copper compound, silver compound, organic compound, and a compound of one of the other metals may be added in an aqueous or non-aqueous solution, if desired. Aqueous solutions, in general, are preferred, however, because of the cost and the ease with which they may be prepared, as indicated in the foregoing examples. If desired, the copper, instead of being added as the basic carbonate, could possibly be added as the nitrate, sulfate, formate, acetate, chloride, etc. Likewise, the silver, if used, may be incorporated in any suitable soluble form. However, the silver may be entirely omitted from the product and process without departing from the spirit and scope of this invention. The effect of the silver is to impart to the product the property of absorbing arsine at high relative humidities. It has been found, however, that the effectiveness of the silver and charcoal against arsine is not destroyed by the use of the organic substance and the compounds of other metals which may be used in the impregnating solution.

The role of the organic substance or compound in the process of this invention is not clearly understood. However, its presence in the impregnated carbon, prior to the final heating, definitely increases the ability of charcoal containing copper and molybdenum or copper and vanadium to absorb cyanogen chloride from gases containing the same, even under conditions of high relative humidity. Also, such charcoals are relatively stable and do not have the property of losing their effectiveness against cyanogen chloride upon storage.

The organic substance which has been found to be particularly useful for assisting in the impregnation and treatment of the charcoals in accordance with this invention is tartaric acid. However, other organic acids and organic substances have also been found to be useful for this purpose. For example, citric acid, maleic acid, succinic acid, adipic acid, sebacic acid, and pyruvic acid, also glycine and ethylenediamine, as well as glycose, sucrose, fructose, maltose, glycerol, and other compounds, have been shown to exhibit the desired effect.

As indicated in the above examples, good results are obtained when the organic substance is used in the impregnating solution in combination with copper and molybdenum, copper and vanadium, or copper and tungsten. In the case of copper and chromium, the organic substance has a tendency to improve the resulting product if it is improperly dried and heated after the impregnating step.

In the case of absorbents containing molybdenum, vanadium or tungsten, heat treatment of the impregnated charcoal should preferably be carried out at a temperature above about 200° C. Best results are obtainable when the temperature of heating is above about 275–300° C. During the heating operation, care should be taken to avoid spontaneous ignition of the sample being heated. This may be controlled to a large extent by heating the sample in an atmosphere of reduced oxygen content.

As suggested in the foregoing, the percentage composition of the several ingredients in the specific solutions mentioned above may be varied without departing from the spirit and scope of this invention. For example, the copper may be present in amounts from about 6 to 12%, the ammonia from about 6 to 15%, the silver nitrate (if silver is used) from about 0.05 to 0.5%, the tartaric acid or other organic substances from about 1 to 15%, the third metallic component from about 1.5 to 6%, and $CO_2$ (as $(NH_4)_2CO_3.H_2O$) from 0 to 10%. These are the preferred ranges in which it has been found that the most satisfactory impregnating solutions can be prepared. Where low concentrations of organic substance are employed, the final product shows a tendency to deteriorate more rapidly on storage in respect to its effectiveness against cyanogen chloride. Also, the cyanogen chloride lives tend to increase with an increase in the percentage of copper and molybdenum, vanadium, chromium or tungsten in the impregnating solution, within the ranges specified above.

While several specific examples of this invention have been given foregoing, it is, of course, contemplated that this invention is not to be limited thereto and is only to be restricted by the scope of the appended claims.

We claim:

1. A process for preparing an absorbent material which consists in impregnating a base charcoal with a solution consisting essentially of water and basic copper carbonate, ammonia, ammonium carbonate, silver nitrate, tartaric acid, and ammonium molybdate dissolved in said water, said solution having the following approximate composition:

| | Percent |
|---|---|
| Copper as basic copper carbonate | 6 to 12.0 |
| $NH_3$ as $NH_4OH$ | 6.0 to 15.0 |
| $AgNO_3$ | 0.05 to 0.5 |
| Tartaric acid | 1.0 to 12.0 |
| Mo as $MoO_3$ | 1.5 to 6.0 |
| $CO_2$ as $(NH_4)_2CO_3.H_2O$ | 0 to 10.0 | and thereafter draining, drying and heating to a temperature above 200° C.

2. A process for preparing an absorbent material which consists in impregnating a base charcoal with a solution consisting essentially of water and basic copper carbonate, ammonia, ammonium carbonate, silver nitrate, tartaric acid, and ammonium vanadate dissolved in said water, said solution having the following approximate composition:

| | Percent |
|---|---|
| Copper as basic copper carbonate | 6 to 12.0 |
| $NH_3$ as $NH_4OH$ | 6.0 to 15.0 |
| $AgNO_3$ | 0.05 to 0.5 |
| Tartaric acid | 1.0 to 12.0 |
| V as ammonium vanadate | 1.5 to 10.0 |
| $CO_2$ as $(NH_4)_2CO_3.H_2O$ | 0 to 10.0 | and thereafter draining, drying and heating to a temperature above 200° C.

3. The product made in accordance with the process of claim 1.

4. The product made in accordance with the process of claim 2.

5. A process for preparing an absorbent material which consists in impregnating a base charcoal with a solution consisting essentially of water and basic copper carbonate, ammonia, ammonium carbonate, silver nitrate, organic acid, and ammonium molybdate dissolved in said water; said solution having the following approximate composition:

| | Percent |
|---|---|
| Copper as basic copper carbonate | 6 to 12.0 |
| $NH_3$ as $NH_4OH$ | 6.0 to 15.0 |
| $AgNO_3$ | 0.05 to 0.5 |
| Organic acid | 1.0 to 12.0 |
| Mo as $MoO_3$ | 1.5 to 6.0 |
| $CO_2$ as $(NH_4)_2CO_3.H_2O$ | 0 to 10.0 | and thereafter draining, drying and heating to a temperature above 200° C., said organic acid consisting of an acid of a group consisting of citric acid, maleic acid, succinic acid, adipic acid, sebacic acid and pyruvic aid.

6. A process for preparing an absorbent material which consists in impregnating a base charcoal with a solution consisting essentially of water and basic copper carbonate, ammonia, ammonium carbonate, silver nitrate, organic acid, and ammonium vanadate dissolved in said water; said solution having the following approximate composition:

| | Percent |
|---|---|
| Copper as basic copper carbonate | 6 to 12.0 |
| $NH_3$ as $NH_4OH$ | 6.0 to 15.0 |
| $AgNO_3$ | 0.05 to 0.5 |
| Organic acid | 1.0 to 12.0 |
| V as ammonium vanadate | 1.5 to 10.0 |
| $CO_2$ as $(NH_4)_2CO_3.H_2O$ | 0 to 10.0 | and thereafter draining, drying and heating to a temperature above 200° C., said organic acid consisting of an acid of a group consisting of citric acid, maleic acid, succinic acid, adipic acid, sebacic acid and pyruvic acid.

7. The product made in accordance with the process of claim 5.

8. The product made in accordance with the process of claim 6.

9. A process for preparing an absorbent material which consists in impregnating a base charcoal with a solution consisting essentially of water and basic copper carbonate, ammonia, ammonium carbonate, silver nitrate, tartaric acid, and a metal salt selected from the group consisting of ammonium vanadate and ammonium molybdate dissolved in said water, said solution having the following approximate composition:

| | Percent |
|---|---|
| Copper as basic copper carbonate | 6 to 12.0 |
| $NH_3$ as $NH_4OH$ | 6 to 15.0 |
| $AgNO_3$ | 0.05 to 0.5 |
| Tartaric acid | 1.0 to 12.0 |
| Said metal salt as its oxide | 1.5 to 10.0 |
| $CO_2$ as $(NH_4)_2CO_3.H_2O$ | 0 to 10.0 | and thereafter draining, drying and heating to a temperature above 200° C.

10. The product made in accordance with the process of claim 9.

References Cited in the file of this patent

UNITED STATES PATENTS

| 1,519,470 | Wilson | Dec. 16, 1924 |
| 2,212,593 | Dittrich | Aug. 27, 1940 |
| 2,227,672 | Pier et al. | Jan. 7, 1941 |
| 2,523,875 | Morrell et al. | Sept. 26, 1950 |